Oct. 21, 1930.  G. E. STORER  1,778,872
APPARATUS FOR THE ROASTING OR SINTERING OF ORES AND THE LIKE
Filed Jan. 18, 1929  3 Sheets-Sheet 1
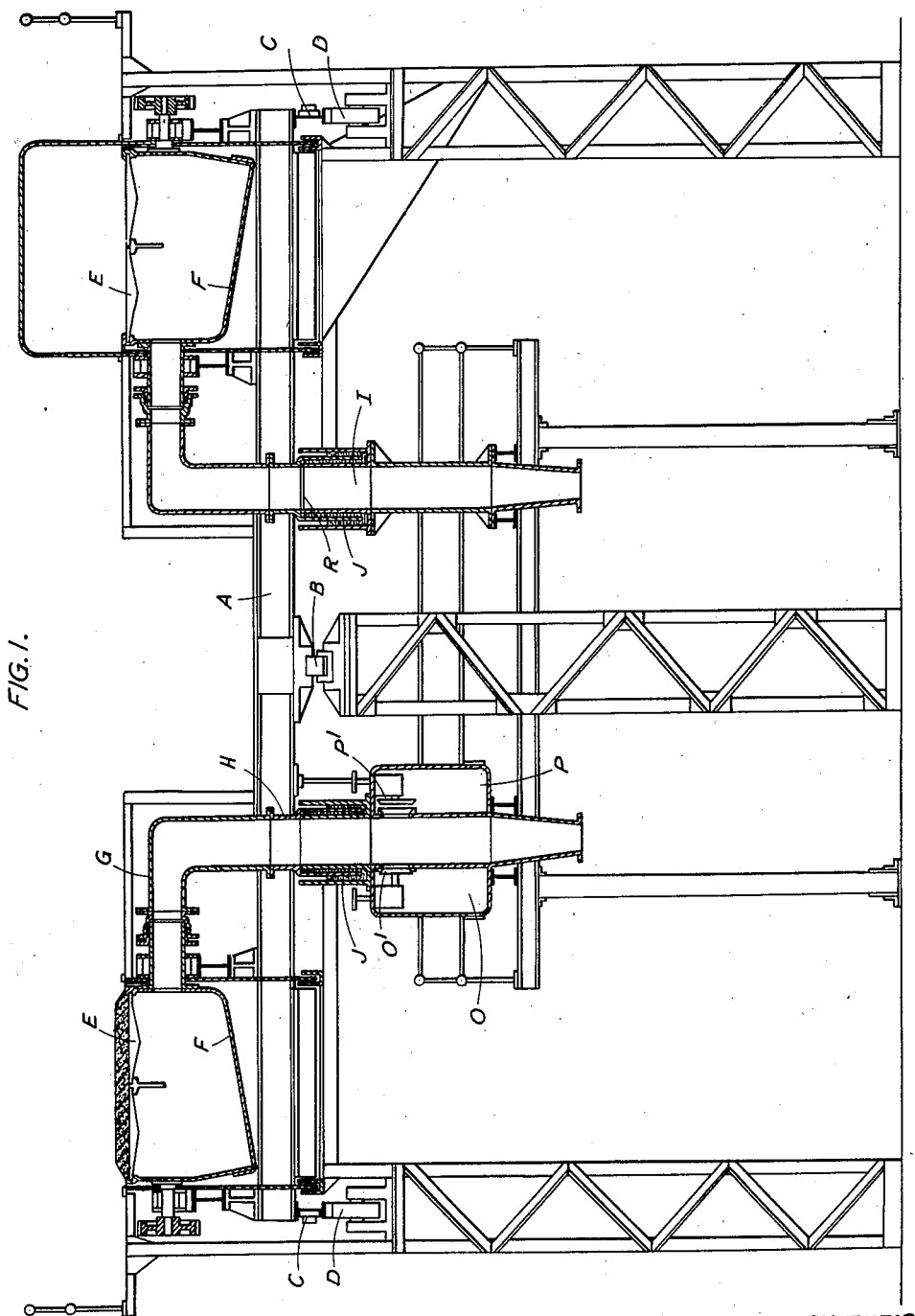

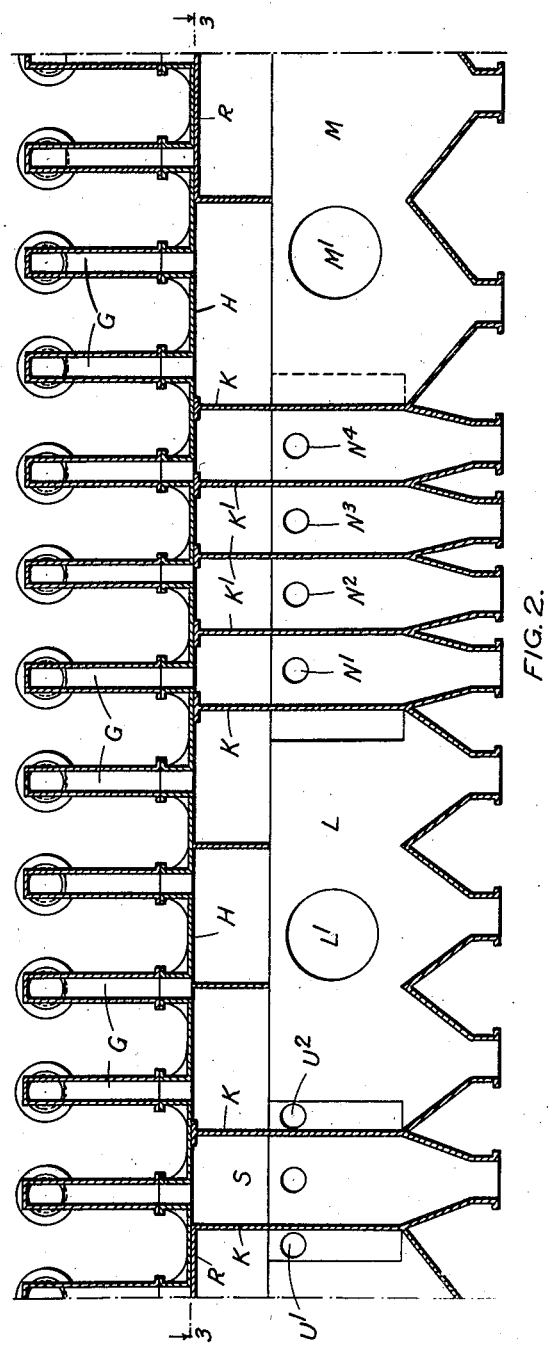

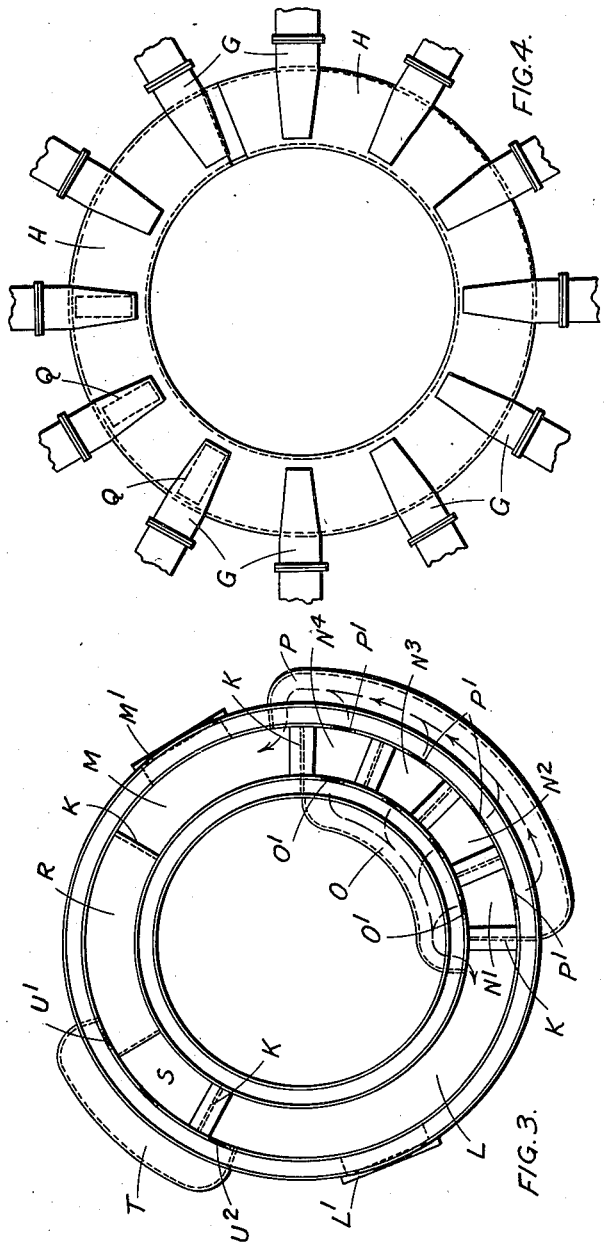

Patented Oct. 21, 1930

1,778,872

UNITED STATES PATENT OFFICE

GEORGE ERIC STORER, OF AVONMOUTH, ENGLAND, ASSIGNOR TO NATIONAL PROCESSES LIMITED, OF LONDON, ENGLAND, AN ENGLISH LIABILITY COMPANY

APPARATUS FOR THE ROASTING OR SINTERING OF ORES AND THE LIKE

Application filed January 18, 1929, Serial No. 333,442, and in Great Britain July 21, 1928.

This invention relates to apparatus for the roasting or sintering of ores and the like. In the process of blast roasting or sintering sulphur-bearing ores, the gases evolved when air is forced or induced through a charge of ignited ore are for a period sufficiently rich in sulphur dioxide for the manufacture of sulphuric acid. As the operation proceeds however the sulphur dioxide content diminishes until the gases become too poor for acid-making purposes and they are then usually exhausted to atmosphere.

In order to separate the gases which are rich enough to be utilized in the manufacture of sulphuric acid from the poorer gases which are useless for this purpose, it has already been proposed to convey the rich and poor gases to separate collecting chambers by connecting these chambers with the gas producing sections of the roasting operation in such a manner that an uninterrupted current of gas of the same quality is directed to each collecting chamber. It was proposed to do this by providing separate gas conduits from each roasting grate to separate collecting chambers provided with inlet apertures arranged in such a manner that those in the rich gas collector were open during the earlier part of the revolution of any given grate while the richer gases were being withdrawn, and thereafter these apertures were closed and those in the poorer gas collector were opened for the remainder of the revolution.

Now it is desirable that an arrangement of this nature should be readily adjustable or subject to control while the operation is in progress, so that the point of division between the richer and the poorer gas collection can be varied within suitable limits in accordance with the conditions obtaining in each operation, which may be affected by the sulphur content of the material undergoing treatment or the rapidity of combustion.

According to the present invention there are provided separate collecting chambers for the rich gas and the poor gas respectively located adjacent, usually beneath, the portions of the rotating apparatus corresponding to the earlier and the later stages of the roasting or like operation, a series of separate gas collecting chambers being arranged intermediate the rich gas and poor gas collectors with bye-pass conduits connecting each of the intermediate chambers with the rich gas and poor gas collectors and valves controlling communication between each of said intermediate chambers and said byepass conduits. Thus by opening or closing these valves the intermediate chambers may be placed in communication with either the rich gas collector or the poor gas collector, and a very accurate control obtained.

It has further been found advantageous to provide a separate gas collector located adjacent the portion of the circle traversed by a grate immediately after it has been recharged with the material for treatment and said material is ignited, this chamber also having valves adapted to connect it with either the rich gas or poor gas collector or with a separate offtake as required.

One constructional form of the present invention is illustrated in the accompanying drawings, in which:—

Fig. 1 is a vertical sectional view of a complete machine.

Fig. 2 is a developed view of the circular gas collecting arrangements.

Fig. 3 is a sectional plan of the fixed part of the gas collection system, as it would be taken on the line 3—3 Fig. 2 but not of course in development.

Fig. 4 is a local plan view of the rotating part of the gas collection system.

Referring to these drawings:—

The machine comprises a rotating frame or platform A mounted on a footstep bearing B and having a circular rail C running on rollers D carried by the fixed framework. Rotating with the platform A is a series of separate grates E arranged in a circle around the complete machine. Each grate E has its own independent gas box F from which leads an offtake pipe G which is turned downwards and terminates in an aperture in an annular plate H between which and a stationary annular chamber I is a liquid seal J forming a gas-tight joint between the rotating and the stationary parts of the gas collecting system.

Referring now more particularly to Figs. 2, 3 and 4:—

The annular chamber I is divided by vertical plates K into two large gas collector chambers L and M, the former being for the reception of the richer gases from the earlier stages of the roasting operation, and the latter chamber M for the poorer gas from the later stages, the collector L having a connection L¹ for a conduit leading for instance to a sulphuric acid plant and the collector M having a connection M¹ for exhaust of the poorer gases for instance to atmosphere or to some other plant for dealing with said gases.

The part of the chamber I lying intermediate the collectors L and M is sub-divided by vertical plates K¹ into a number of smaller chambers N¹, N², N³ and N⁴. A bye-pass conduit O communicates freely with the rich gas collector L and with the chambers N¹ to N⁴ through valve controlled openings O¹. Another bye-pass conduit P communicates freely with the poor gas collector M and with the chambers N¹ to N⁴ through valve-controlled openings P¹. In this manner by operating the appropriate valves O¹ or P¹ any one or more of the chambers N¹ to N⁴ can be put into communication with either the rich gas collector L or poor gas collector M and an accurate control obtained of the period in the roasting operation when the sulphur dioxide content of the gases is diminishing to the point at which they are useless for the manufacture of sulphuric acid.

Preferably in order to give a quick cut-off between the chambers L, M and N¹ to N⁴ the upper ends of the vertical plates K and K¹ are provided with flanges somewhat wider than the apertures in the traveling plate H, said apertures being preferably made of rectangular section as shown at Q Fig. 4. Over that part of the revolution at which the grates E are being emptied, re-charged and the fresh charge ignited a floor or dead plate R is provided so that the grates at such time are not subjected to suction. Immediately after leaving the dead plate, a grate with its ignited charge passes over a stationary chamber S divided off from the collectors L and M and opening freely into a bye-pass conduit T which in turn communicates by means of valves U¹ and U² with the collectors L and M respectively, so that the gases given off immediately after ignition may be utilized or not according to their quality. The conduit T may also be connected to a separate offtake through the valve controlled opening T¹ if required.

The bottoms of all the gas collecting chambers are formed as hoppers for the collection of any dust or suspended matter which may have been carried in with the gases valves (not shown) being provided for the discharge of such material, which however so long as it remains in the hoppers provides an additional seal against the admission of air or the loss of gas.

Although the improved machine has been described as applied more particularly to the roasting or sintering of ores, said machine may be used for any operations to which it may be applicable and in which a material has to be continuously subjected to combustion with withdrawal of evolved gases of varying quality which should be collected separately.

What I claim is:—

1. A rotary ore-roasting or the like apparatus of the kind adapted for the separate collection of gases of varying quality from successive stages of the operation, comprising in combination separate collecting chambers for the rich gases and the poor gases respectively located adjacent the portions of the apparatus corresponding to the earlier and the later stages of the roasting or like operation, a series of separate gas collecting chambers arranged intermediate the rich gas and poor gas collectors, bye-pass conduits connecting each of the intermediate chambers with the rich gas and poor gas collectors and valves controlling communication between each of said intermediate chambers and said bye-pass conduits.

2. Apparatus in accordance with claim 1 in which a separate gas collector is located adjacent the portion of the circle traversed by a grate immediately after it has been re-charged with the material for treatment and said material is ignited, the said chamber having valves adapted to connect said chamber with either the rick gas or poor gas collector of a separate offtake as required.

3. A rotary ore-roasting or the like apparatus comprising a series of separate grates arranged in a circle to form a rotating table for the reception of the material to be treated, a corresponding separate gas box lying beneath each of said grates, an offtake pipe leading from each gas box and terminating in an aperture in an annular plate which rotates with said pipes two separate gas collector chambers fixedly arranged beneath said annular plate in positions corresponding to the earlier and the later stages of the roasting or like operation, and connected respectively to separate offtakes for the rich gas and the poor gas, a plurality of smaller gas collecting chambers arranged intermediate the two first-named chambers, bye-pass conduits connecting said smaller chambers with the first-named chambers and valves controlling communication between said smaller chambers and said bye-pass conduits.

4. A rotary ore-roasting or the like apparatus comprising a series of separate grates arranged in a circle to form a rotating table for the reception of the material to be treated, a corresponding separate gas box lying beneath each of said grates, an offtake pipe leading from each gas box and terminating in an aperture in an annular plate which rotates with said pipes, two separate gas collector chambers fixedly arranged beneath said annular plate in positions corresponding to the earlier and the later stages of the roasting or like operation, and connected respectively to separate offtakes for the rich gas and the poor gas, a plurality of smaller gas collecting chambers arranged intermediate the two first-named chambers, bye-pass conduits connecting said smaller chambers with the first-named chambers, valves controlling communication between said smaller chambers and said bye-pass conduits, and a fixed floor or "dead plate" provided in a position in the apparatus corresponding to that at which the grates are emptied and re-charged so that during such period the grates are not subjected to suction, substantially as described.

5. A rotary ore-roasting or the like apparatus of the kind adapted for the separate collection of gases of varying quality from successive stages of the operation, comprising in combination separate collecting chambers for the rich gases and the poor gases respectively located adjacent the portions of the apparatus corresponding to the earlier and the later stages of the roasting or like operation, a series of separate gas collecting chambers arranged intemediate the rich gas and poor gas collectors, bye-pass conduits connecting each of the intermediate chambers with the rich gas and poor gas collectors, valves controlling communication between each of said intermediate chambers and said bye-pass conduits, hoppers formed at the lower ends of the various gas collector chambers for the collection of dust or suspended matter carried into said chambers with the gases, and valves to enable said hoppers to be emptied.

6. Apparatus in accordance with claim 1 in which a separate gas collector is located adjacent the portion of the circle traversed by a grate immediately after it has been recharged with the material for treatment and said material is ignited, the said chamber having valves adapted to connect said chamber with either the rich gas or poor gas collector or a separate offtake as required and wherein the various gas collector chambers terminate at their lower ends in hoppers for the collection of dust or suspended matter carried into said chambers with the gases, valves being provided to enable said hoppers to be emptied.

7. A rotary ore-roasting or the like apparatus comprising a series of separate grates arranged in a circle to form a rotating table for the reception of the material to be treated, a corresponding separate gas box lying beneath each of said grates, an offtake pipe leading from each gas box and terminating in an aperture in an annular plate which rotates with said pipes, two separate gas collector chambers fixedly arranged beneath said annular plate in positions corresponding to the earlier and later stages of the roasting or like operation, and connected respectively to separate offtakes for the rich gas and the poor gas, a plurality of smaller gas collecting chambers arranged intermediate the two first-named chambers, bye-pass conduits connecting said smaller chambers with the first-named chambers, valves controlling communication between said smaller chambers and said bye-pass conduits, hoppers at the lower ends of the various gas collector chambers for the collection of dust or suspended matter carried into said chambers with the gases, and valves to enable said hoppers to be emptied.

8. A rotary ore-roasting or the like apparatus comprising a series of separate grates arranged in a circle to form a rotating table for the reception of the material to be treated, a corresponding separate gas box lying beneath each of said grates, an offtake pipe leading from each gas box and terminating in an aperture in an annular plate which rotates with said pipes, two separate gas collector chambers fixedly arranged beneath said annular plate in positions corresponding to the earlier and the later stages of the roasting or like operation, and connected respectively to separate offtakes for the rich gas and the poor gas, a plurality of smaller gas collecting chambers arranged intermediate the two first-named chambers, bye-pass conduits connecting said smaller chambers with the first-named chambers, valves controlling communication between said smaller chambers and said bye-pass conduits, a fixed floor or "dead plate" in a position in the apparatus corresponding to that at which the grates are, emptied and re-charged so that during such period the grates are not subjected to suction, hoppers formed at the lower ends of the various gas collector chambers for the collection of dust or suspended matter carried into said chambers with the gases, and valves to enable said hoppers to be emptied.

GEORGE ERIC STORER.